United States Patent [19]
Graves et al.

[11] Patent Number: 5,610,373
[45] Date of Patent: *Mar. 11, 1997

[54] WEIGH SCALE AND METHOD FOR CALIBRATING SAME

[75] Inventors: Delbert B. Graves, Warren; Michael L. Pyle; Victor Rossol, both of Rockford; Paul R. Buhr, Davis, all of Ill.

[73] Assignee: Sunbeam Corporation, Fort Lauderdale, Fla.

[ * ] Notice: The terminal 25 months of this patent has been disclaimed.

[21] Appl. No.: 94,581

[22] Filed: Jul. 19, 1993

Related U.S. Application Data

[63] Continuation of Ser. No. 891,362, May 29, 1992, abandoned.

[51] Int. Cl.⁶ .......................... G01G 19/52; G01G 21/08; G01L 25/00
[52] U.S. Cl. ................... 177/50; 177/1; 177/256; 73/1 B
[58] Field of Search ................... 177/1, 50, 256; 73/1 B

[56] References Cited

U.S. PATENT DOCUMENTS

| | | |
|---|---|---|
| 2,926,010 | 2/1960 | Kennaway et al. . |
| 3,123,165 | 3/1964 | Carson, Jr. et al. . |
| 3,186,505 | 6/1965 | Vinzelberg et al. . |
| 3,589,460 | 6/1971 | Hanssen ................. 177/256 |
| 3,759,338 | 9/1973 | Petersen et al. ........ 177/256 X |
| 4,030,559 | 6/1977 | Fish et al. .............. 177/256 X |
| 4,072,201 | 2/1978 | Wiesler . |
| 4,085,811 | 4/1978 | Knothe et al. . |
| 4,258,812 | 3/1981 | Pfeiffer . |
| 4,326,596 | 4/1982 | Beck . |
| 4,452,326 | 6/1984 | Hanssen et al. ........ 177/256 |

FOREIGN PATENT DOCUMENTS

| | | |
|---|---|---|
| 2649730 | 8/1977 | Germany . |
| 2713911 | 10/1977 | Germany . |

Primary Examiner—George H. Miller, Jr.
Attorney, Agent, or Firm—Michael J. Kline

[57] ABSTRACT

An improved scale, including bathroom-type scales, is provided by employing markings on the dial for calibrating the scale using photosensor equipment. The adjusting nut of the scale and the calibration stud of the scale are both accessible for automated mechanical calibration after assembly of the scale. As a result, an iterative calibration procedure is employed by machine as opposed to traditional manual methods. Photosensors read the dial and send a signal to mechanical driver or wrench mechanisms for automated calibration. The improved scale and calibration method reduces labor and production costs.

25 Claims, 7 Drawing Sheets

WEIGH SCALE AND METHOD FOR CALIBRATING SAME

This is a continuation of Ser. No. 07/891,362 filed on May 29, 1992, now abandoned.

This invention relates generally to scales in general and specifically to bathroom-type scales which include a scale mechanism comprising a main spring and a conventional dial disposed between a bottom pan and an upper housing. More particularly the invention pertains to a scale which can be calibrated by an automated machine as opposed to manual calibration by an operator. This invention also relates to an improved method of calibration of such scales which is not as labor-intensive as previously known calibration techniques.

BACKGROUND OF THE INVENTION

Perhaps the most labor-intensive step in the manufacture of a conventional bathroom-type scale is the calibration of the scale. Currently, conventional scales are calibrated manually by repetitive iteration; the operator repetitively adjusts the scale at zero and at a high pound level, such as 150 or 200, until the scale measures accurately. The present invention eliminates the time consuming procedure of manual calibration by providing a scale that can be calibrated by machine.

An understanding of the improvement represented by the present invention requires an understanding of the working parts of a scale and how a scale is conventionally calibrated. Conventional scales include three major components: the bottom pan, the scale mechanism and the upper housing. The scale mechanism is disposed between the upper housing and the bottom pan and includes a lever system, a main spring and a dial or weight indicator. The dials are normally round and pivot about a central axis. Weight applied to the upper housing is transmitted through the lever system to the main spring causing it to elongate proportionally to the weight. The elongation is transmitted to the dial causing it to rotate proportionally to the weight applied to the upper housing. Reading the dial through a window in the upper housing indicates the weight.

In order to ensure acceptable accuracy of the scale, the complete scale must be calibrated so that the weight indication is correct at the applied weight and at the zero position with no weight applied to the upper housing. The two parts employed by conventional scales for calibration purposes are the adjusting nut and the calibrating stud.

A conventional calibrating process is performed as follows. As an assembled scale comes off the assembly line, an operator places the scale on a flat surface. At this point, no weight is applied to the scale. Normally the scale dial must be "zeroed" by adjusting the adjusting nut. Then, a predetermined calibration weight, such as 200 pounds, is applied to the top of the scale. Normally, the scale will not read exactly 200 pounds because the main spring of the scale must be calibrated. Main spring elongation is not properly proportioned to the weight applied thus giving an incorrect weight reading. The calibration weight is now removed from the scale. Adjustment of the main spring elongation is accomplished by rotating the calibration stud until the dial reads the predetermined calibration weight (200 pounds). The scale must be re-zeroed since the adjustment to the calibration stud will necessarily affect the zero reading of the scale. Thus, the adjusting nut is turned until the zero on the scale lines up with the read mark. After the scale is re-zeroed, the calibration weight is again applied to the scale and the operator determines whether the calibration stud must be re-adjusted. Very often the calibration weight is now slightly out of adjustment, though closer to the designated weight than before.

A scale is acceptably calibrated when two successive and accurate readings are attained, either an accurate zero reading followed by an accurate calibration weight reading, or vice versa. To acceptably calibrate a conventional scale, an operator must normally perform successive zero and calibration weight calibrations two to three times. On occasion, an operator must perform these calibrations four to five times. Thus, the calibration procedure takes time and limits the rate of manufacture.

The present invention overcomes the above problem by providing a scale that may be calibrated by a machine, rather than manually. By calibrating conventional scales by a machine, the manufacturer can eliminate a labor-intensive step in the manufacturing process and thereby reduce labor and manufacturing costs.

BRIEF DESCRIPTION OF THE INVENTION

The present invention makes a significant contribution to the bathroom scale industry by transforming a conventional bathroom-type scale that must be manually calibrated into a scale that may be calibrated by machine. The present invention accomplishes this without expensive modifications to the basic design of the scales already in production. Further, the modifications incorporated by the present invention do not affect the aesthetics or appearance of the scales.

The improved, mechanically calibratable scale includes a bottom pan, an upper housing and a scale mechanism disposed there between. The scale mechanism includes a main spring and a round dial. The main spring is adjusted using a calibration stud; the zero position of the dial is adjusted using an adjusting nut.

The upper housing of the scale includes at least two access holes. A first access hole is located over the calibrating stud which enables access to the stud by a motorized wrench for calibration of the scale after assembly. The second access hole in the upper housing is located over the outer periphery of the dial. The second access hole provides access to the outer periphery of the dial by photosensors. The access holes are all hidden under the foot pad (not shown) and do not affect the appearance of the scale.

The round dial includes at least two markings in the outer periphery. Both markings are distinguishable from the background of the dial by photosensors. When the scale is properly calibrated, the end of the first marking is located underneath the second access hole of the upper housing when the scale dial reads zero. Similarly, when the scale is properly calibrated, the end of the second marking is located underneath the second access hole of the upper housing when the scale dial reads the predetermined calibration weight, such as 200 pounds.

The adjusting nut of the scale is of a flat, circular disk shape which includes notches on the outer periphery of the knob. The adjusting nut extends out of an aperture located in the scale enabling the notches to be accessible to a driver for the zero calibration of the scale after assembly of the scale. The configuration and location of the adjusting nut being largely unchanged with the exception of the incorporation of the notches.

The scale is automatically calibrated as follows. First, the scale comes off the assembly line and is placed on a flat surface with zero weight applied to scale. The photosensors read the outer periphery of the dial through the second hole in the upper housing. If the photosensors do not see the contrasting hues of the first marking and the background of the dial, then a motorized driver engages the adjustment nut and rotates the adjusting nut in proper direction until the end of the first marking appears below the second hole in the upper housing as indicated by the photosensors. The contrasting hues are so located on the dial that when the first marking appears below the second hole, and hence the contrasting hues are presented to the photosensor, the zero weight will be at the dial read position.

Second, a predetermined calibration weight, such as 200 pounds, is applied to the top of the scale. The photosensors look through the second hole in the upper housing for the contrasting hues at the end of the second marking and the background of the dial. If the end of the second marking does not appear below the second hole in the upper housing, a motorized wrench engages the calibration stud and rotates it in the proper direction until the dial reads the proper calibration weight thereby causing the end of the second marking to appear below the second hole in the upper housing. The contrasting hues are so located on the dial that when the second marking appears below the second hole, and hence the contrasting hues are presented to the photosensor, the calibration weight will be at the dial read position.

The zero calibration is then repeated. If a second zero knob adjustment is required, the predetermined calibration weight is again applied to the scale and the calibration stud is adjusted. The sequence is repeated until two correct, successive readings are attained in succession, either a correct zero reading followed by a correct 200-pound reading, or vice versa.

BRIEF DESCRIPTION OF THE DRAWINGS

This invention is illustrated more or less diagrammatically in the accompanying drawings wherein.

DETAILED DESCRIPTION OF THE INVENTION

Like reference numerals will be used to refer to like or similar parts from Figure to Figure in the following description of the drawings.

Figure 1:
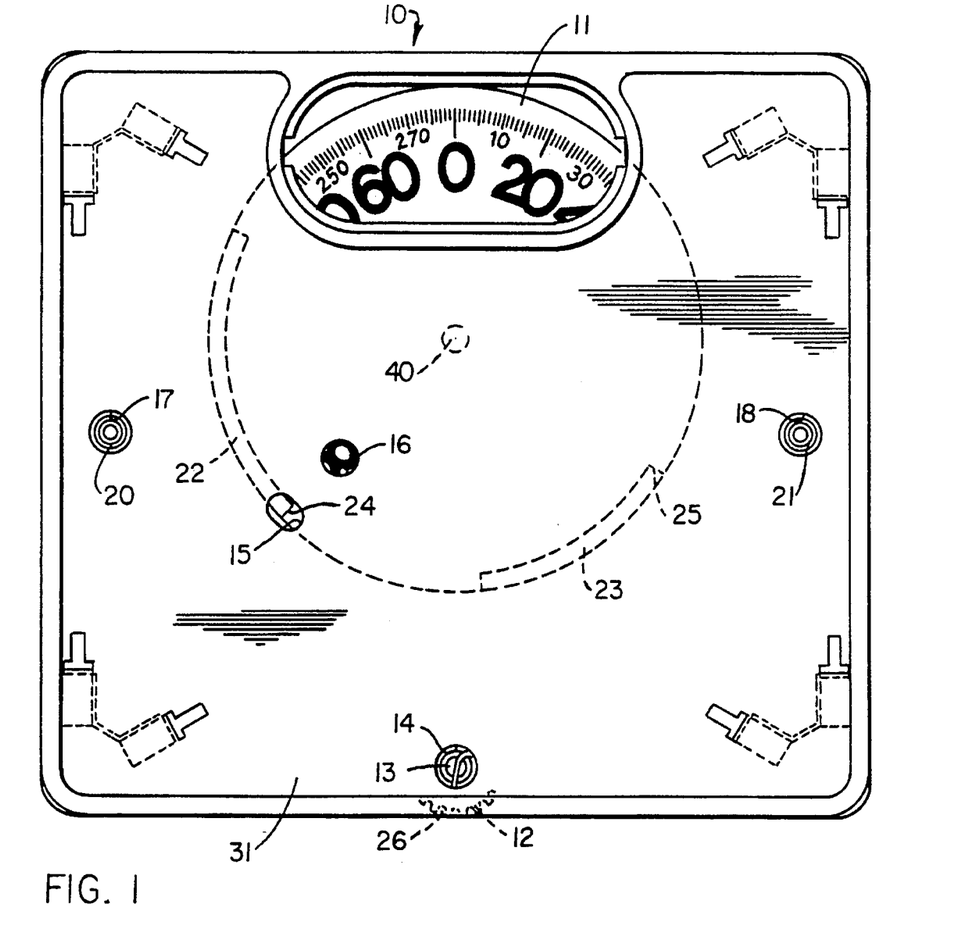
FIG. 1 is a top plan view of a bathroom-type scale made in accordance with the present invention without the foot pad.

The dramatic improvement provided by this invention is best understood after consideration of how a scale is calibrated manually. Scales are calibrated using an iterative process. First, a scale, similar to that shown at 10 in FIG. 1, is placed on a flat surface without weight. Normally, the scale dial 11 does not display a zero reading. An operator must manually adjust the zero knob 12 until the dial 11 properly reads zero.

Figure 10:
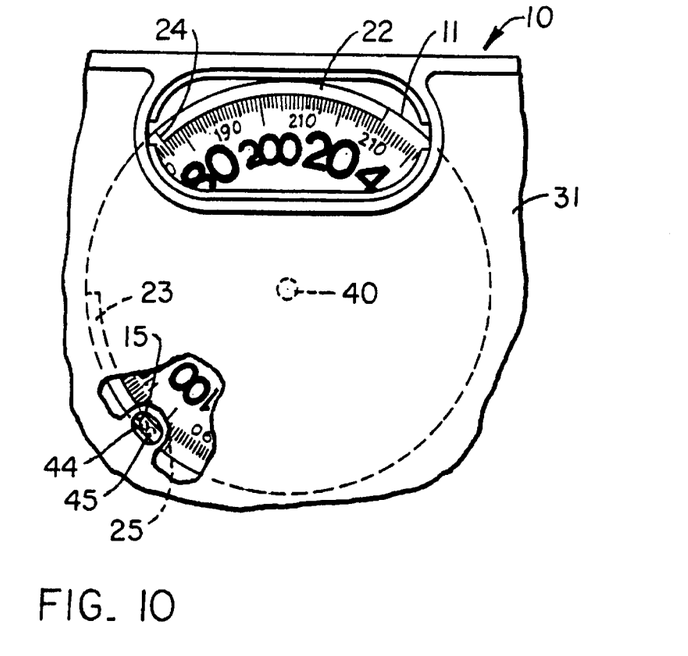
FIG. 10 shows a bathroom-type scale in need of 200-pound calibration following the zero calibration.

Then, a 200-pound weight is applied to the scale (see FIG. 10). Normally, as seen in FIG. 10, the scale does not accurately display a 200-pound reading. To adjust the scale to read 200 pounds, the calibration stud, shown at 13 in FIG. 1, is rotated by the operator until the scale dial 11 properly reads 200 pounds. The process must be repeated until successive, accurate zero and 200-pound readings are attained. Normally the cycle must be repeated two to three times, and sometimes up to four to five times, until the scale 10 is acceptably calibrated.

As seen in FIG. 1, the upper housing of the improved bathroom-type scale 10 includes three access holes, 14, 15, 16 in addition to the holes 17, 18 provided for the hook-up springs 20, 21 respectively. The addition of access holes 14, 15, 16 does not affect the appearance of the scale; all holes 14–18 are concealed by a foot pad (not shown) which overlies the upper housing 31 and acts as a foot receiving surface for the user. The access hole 14 enables a motorized wrench to engage the calibration stud 13 for the 200-pound calibration. The selection of the calibration weight is not entirely arbitrary, but need not be 200 pounds. For example, manufacturers may choose to calibrate at 150 or 250 pounds.

Access hole 15 enables photosensing means (not shown) to read the markings 22, 23 on the dial 11. In FIG. 1, it is noted that the scale 10 is reading approximately zero pounds. The end 24 of the first marking 22 is disposed underneath the access hole 15. The scale 10, as shown in FIG. 1, is properly calibrated at the zero reading. The second marking 23 and the end 25 of the second marking 23 will be used in the 200-pound calibration as discussed below.

Also shown in FIG. 1 is the adjusting nut 12 of the scale 10. The adjusting nut 12 includes a plurality of notches, shown generally at 26, that engage a motorized driver for the zero calibration. When the end 24 of the first marking 22 is not disposed underneath the access hole 15 with no weight applied to the scale, the photosensors (not shown) send a signal to the motorized driver (not shown) and the driver turns the adjusting nut 12 in the proper direction until the scale dial 11 accurately reads zero pounds. When the photosensors see the end 24 of the first marking 22 through the access hole 15, the photosensors send a stop signal to the motorized driver. The scale 10 being properly zeroed, the next step in the calibration is to calibrate the scale 10 with 200 pounds or an alternative calibration weight applied to the scale.

Figure 2:
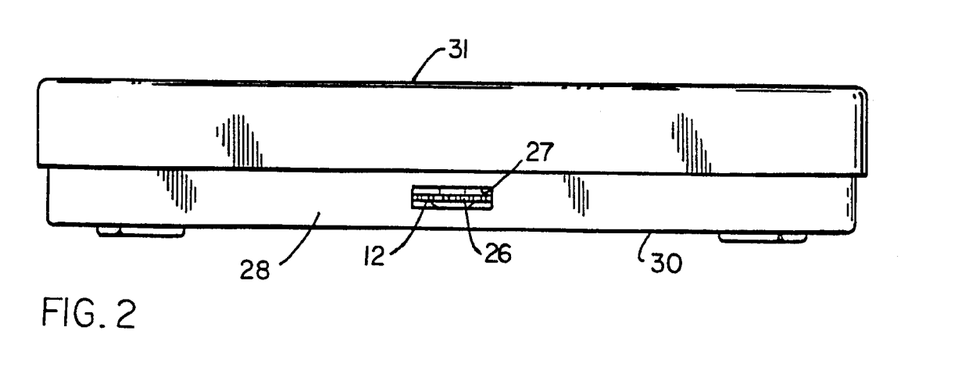
FIG. 2 is a front elevational view of the bathroom-type scale shown in FIG. 1 illustrating particularly the zero knob.

FIG. 2 shows the aperture 27 in the front wall 28 of the bottom pan 30. The zero knob 12 and the notches, shown generally at 26, extend outward through the aperture 27 of the bottom pan 30 enabling a motorized driver to engage the zero knob 12 for the zero calibration. FIG. 2 also shows how the upper housing 31 fits over the bottom pan 30. The upper housing 31 is flexibly attached to the bottom pan 30 by the hook-up springs 20 and 21 (see FIG. 1).

Figure 3:
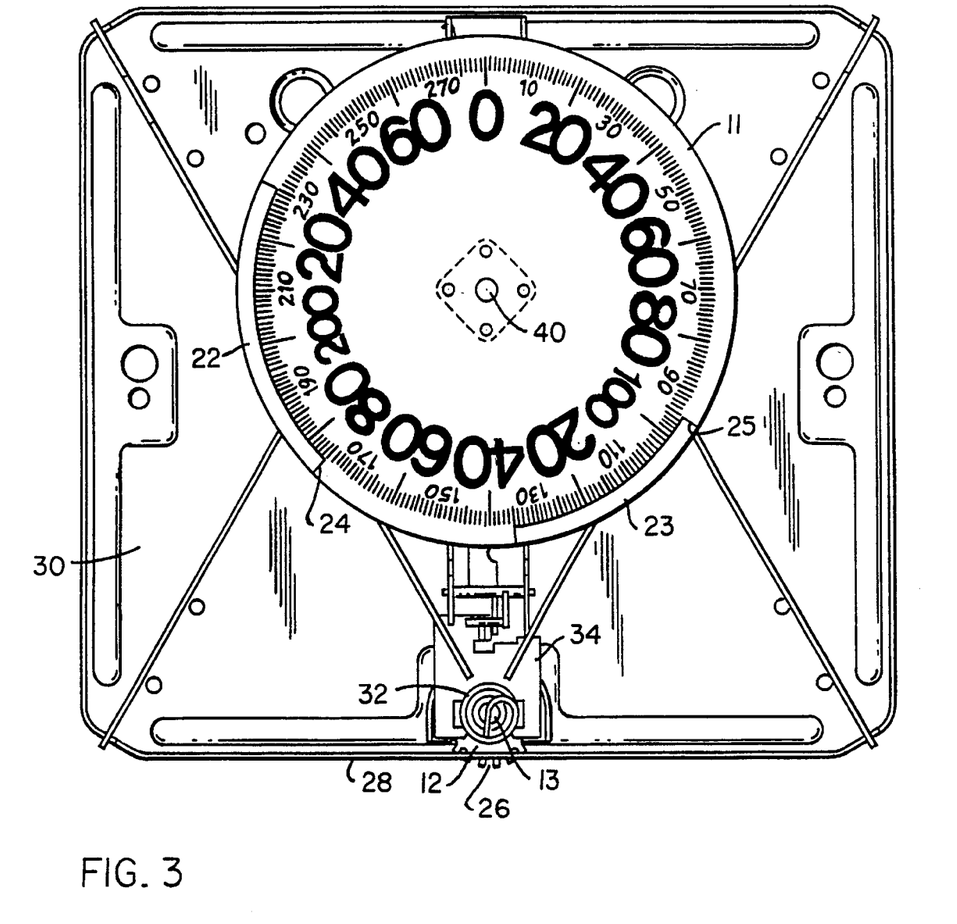
FIG. 3 shows the bathroom-type scale shown in FIG. 1 with the upper housing removed thereby exposing the working parts of the scale.

FIG. 3 is a top plan view of the scale shown in FIG. 1 with the upper housing 31 (see FIG. 1) removed. The first marking 22, and specifically the end 24 of the first marking 22, is used in combination with a photosensor to zero calibrate the scale. The marking 22 is of a hue that is photoelectrically distinguishable from the background hue of the dial 11. In other words, if the background of the dial 11 is white, then the color of the markings 22 (and 23 for that matter) should be black or some other dark color. The photosensor will pick up the difference between a dark hue and a light hue thereby enabling it to "find" the ends 24, 25. The present invention could work equally well with black (or dark) dials 10 with white numbering and white (or light) markings 22, 23.

The preferred embodiment of the calibrating apparatus employs two photosensors. One photosensor reads dark hues and the other photosensor reads light hues. When one photosensor reads a dark hue and the other photosensor reads a light hue, an end 24 or 25 of a marking 22 or 23 must be directly beneath the pair of photosensors. As shown in FIG. 3, the dial 11 is accurately reading zero. The two photosensors would pick up the background of the dial 11 and the end 24 of the first marking 22 and thereafter send a signal to the motorized driver to stop turning the adjusting nut 12.

Figure 4:
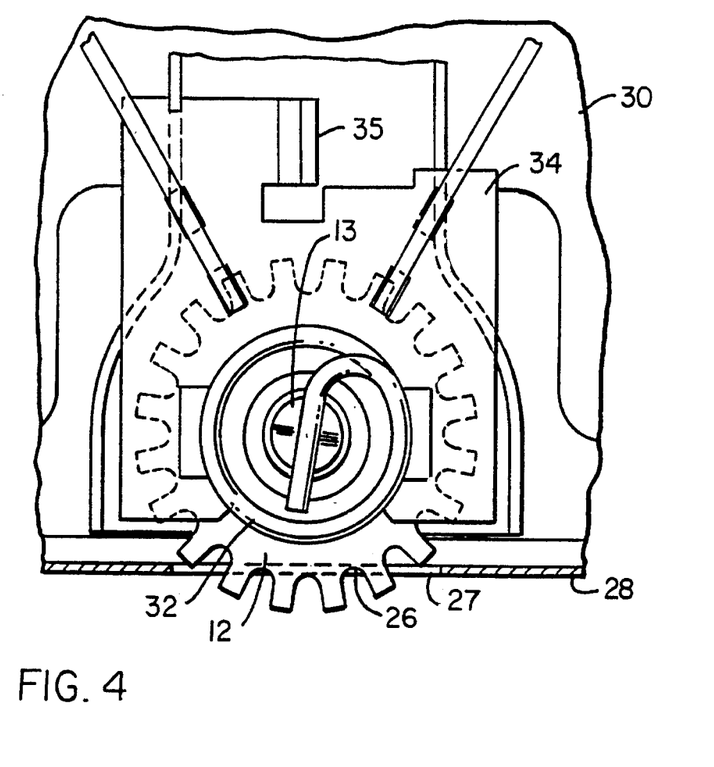
FIG. 4 is view to an enlarged scale of the adjusting nut, calibration stud and main spring.

FIG. 4 is an expanded view of the adjusting nut 12, main spring 32 and the calibration stud 13. The adjusting nut 12 is equipped with notches, shown generally at 26, on its outer periphery. The notches 26 engage a motorized driver (not shown) during the zero calibration. The calibration stud 13 engages a motorized wrench mechanism (not shown) during the 200-pound calibration. The wrench mechanism engages the calibration stud 13 through the access hole 14 in the upper housing 31 (see FIG. 1).

Figure 5:
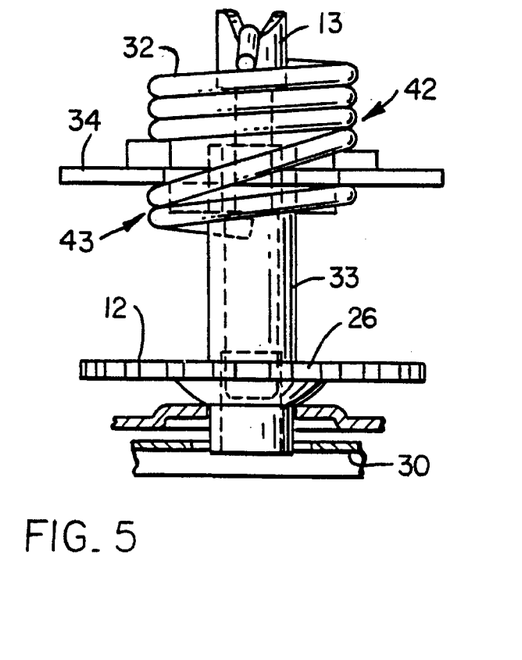
FIG. 5 is a front elevational view of the adjusting nut, calibration stud and main spring shown in FIG. 4.
Figure 6:
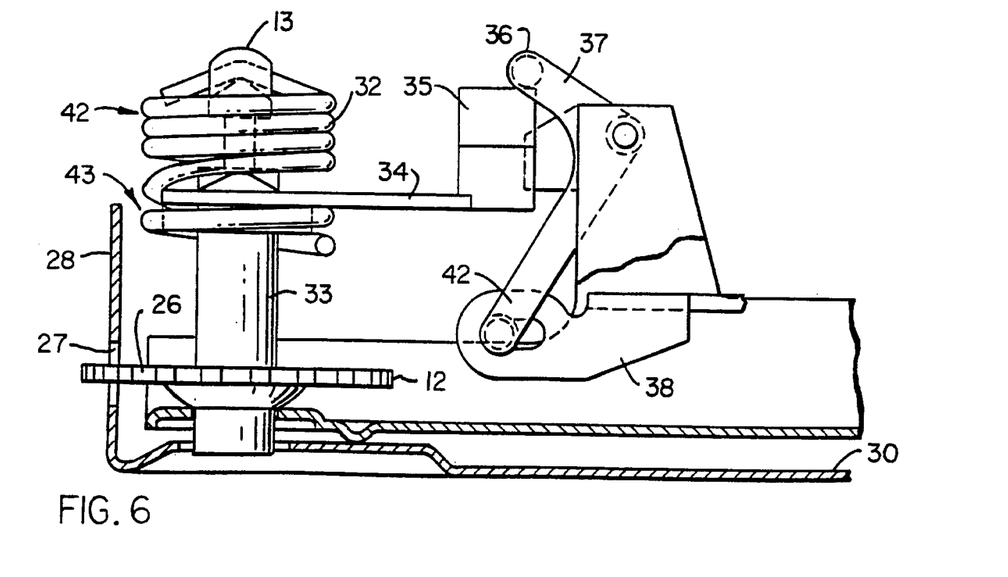
FIG. 6 is a right side view of the adjusting nut, calibration stud and main spring shown in FIG. 5 and a right side view of the bell crank linkage of the scale mechanism.
Figure 7:
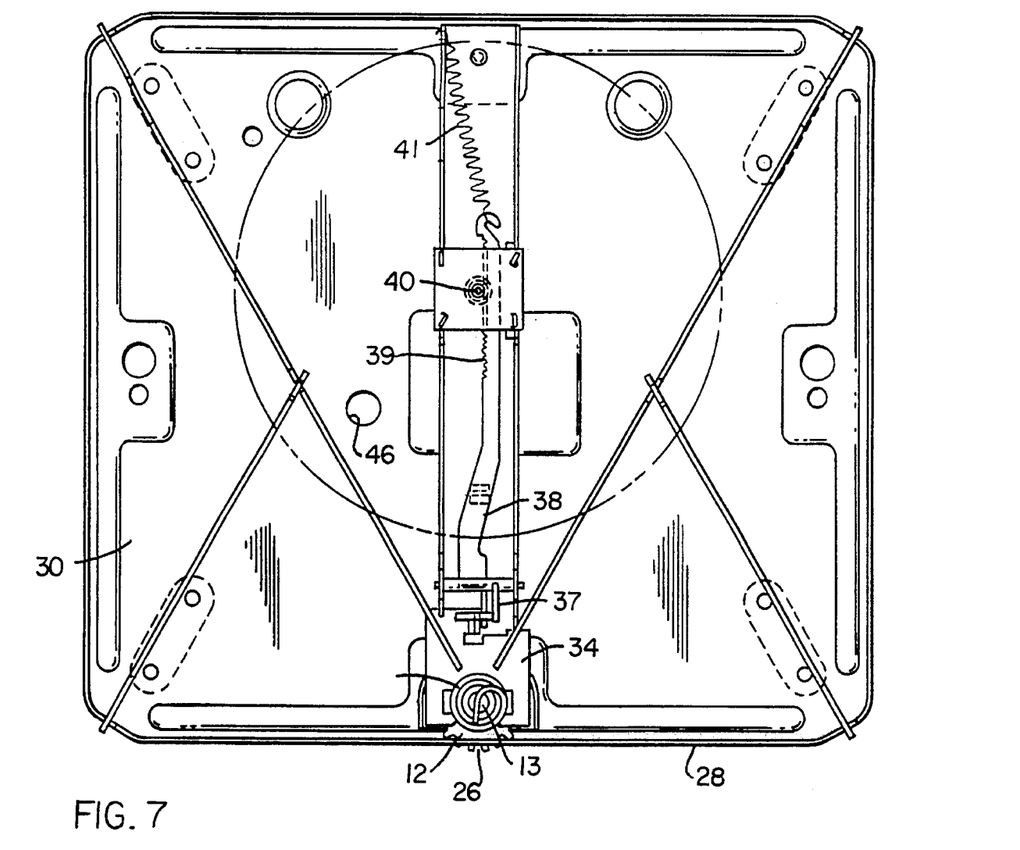
FIG. 7 is a top view of the scale shown in FIG. 3 with the dial removed thereby exposing additional working parts of the scale mechanism.
Figure 8:
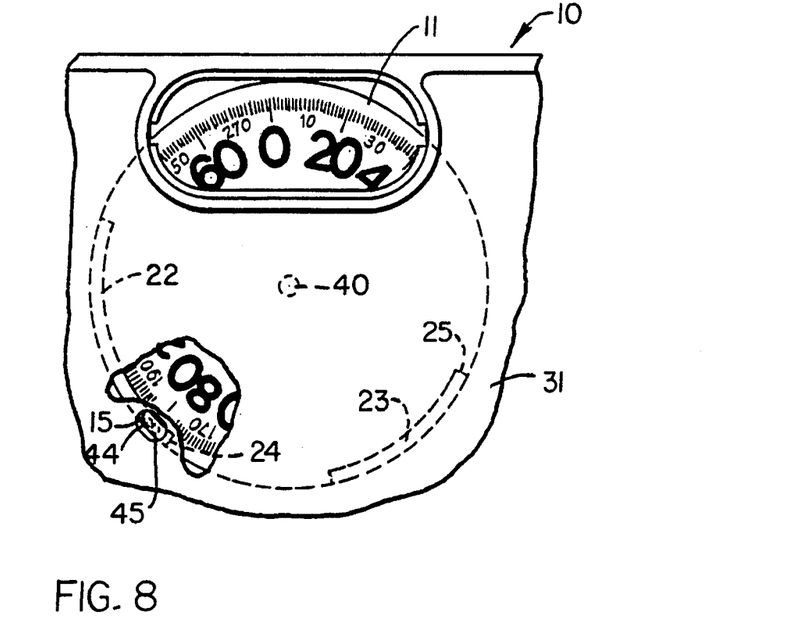
FIG. 8 shows a bathroom-type scale in need of zero calibration.

The mechanical workings of the scale 10 as shown are best understood upon examination of FIGS. 5 through 7. The scale 10 is zeroed by rotating the adjusting nut 12. The adjusting nut 12 is a single piece of plastic or metal material that is threaded on the inside of its cylindrical receiving end 33. The cylindrical receiving end 33 mateably engages the threaded end of the calibrating stud 13. When the zero knob is rotated, the calibration stud 13 is either raised or lowered, thereby raising or lowering the main spring 32 and the spring plate 34. By raising or lowering the spring plate 34, the spring plate extension tab 35 (see FIG. 6) is thereby raised or lowered, which, in turn, raises or lowers the top end 36 of the bell crank 37. Movement of the bell crank 37 provides movement to the bell crank bottom 42 and to the rack 38 which in turn engages the pinion 40, see FIG. 7, with teeth 39 thereby rotating the dial 11. The rack spring 41 (see FIG. 7) ensures that the rack 38 and the bell crank bottom 42 of the bell crank 37 are under rearward tension. This action results in a downward force on the top end 36 of the bell crank 37. Therefore, there is always contact engagement between the spring plate extension tab 35 and the top end 36 of the bell crank 37.

The access hole 46 (See FIG. 7) in the bottom pan 30 provides air jet access to the dial 11. The access hole 46 acts in combination with the access hole 16 (See FIG. 1) in the upper housing. Two air jets are provided, one blowing downwardly through access hole 16 and one blowing upwardly through access hole 46. The two oppositely directed air jets provide a "air bearing" to the dial ensuring near frictionless movement of the dial during calibration. The air jets ensure that the dial moves freely during calibration while being stabilized within the proper proximity to the photosensors.

During the zero calibration, if the dial 11 requires clockwise adjustment, the adjusting nut 12 is turned clockwise, thereby causing the calibration stud 13, the main spring 32 and the spring plate 34 to move upward thereby causing the spring plate extension tab 35 to push the top end 36 of the bell crank 37 upward thereby pulling the bell crank bottom 42 and the rack 38 frontward toward the zero knob. The teeth 39 of the rack 38 engage the pinion 40 and the frontward movement of those teeth 38 thereby causes clockwise adjustment of the dial 11. Similarly, if counterclockwise correction of the dial 11 is required, the adjusting nut 12 is rotated in a counterclockwise fashion.

During the zero calibration, if both photosensors read the hue of the marking 22, a signal is sent to the motorized driver calling for clockwise adjustment of the adjusting nut 12. If both photosensors read the background hue of the dial 11 during the zero calibration, a signal is sent to the motorized driver calling for counterclockwise adjustment of the adjusting nut 12.

During the 200-pound calibration, the calibration stud 13 is rotated. Rotating the calibration stud 13 also turns the main spring 32 thereby increasing or decreasing the number of active coils, shown generally at 42, and inactive coils, shown generally at 43.

When the predetermined calibration weight is applied to the scale, such as 200 pounds, and the scale dial reads in excess of 200 pounds, the number of active coils 42 must be reduced and the number of inactive coils 43 must be increased. To accomplish this, the calibration stud 13 is rotated in the clockwise direction. Thus, during the 200 pound calibration, if both photosensors read the hue of the marking 23, the scale 10 is reading too high, and a signal is sent to the motorized wrench calling for clockwise adjustment of the calibrating stud 13.

If, when the predetermined calibration weight of 200 pounds is applied and the scale reads less than 200 pounds, the number of active coils 42 must be increased and the number of inactive coils 43 decreased. To accomplish this, the calibration stud 13 is rotated in the counterclockwise direction. Thus, during the 200 pound calibration, if the photosensors read the background hue of the dial 11, then the scale is reading too low and a signal is sent to the motorized wrench calling for counterclockwise adjustment of the calibration stud 13.

Figure 9:
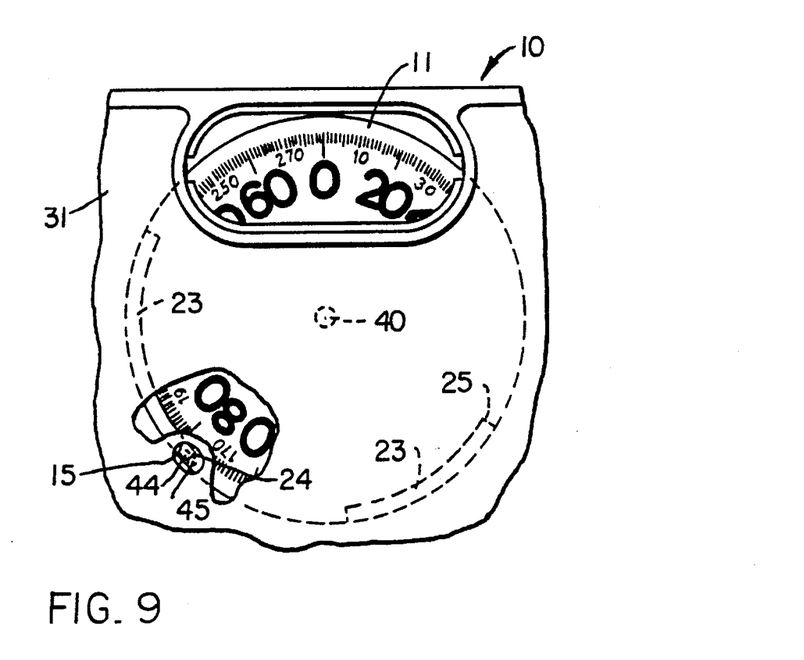
FIG. 9 shows a bathroom-type scale properly calibrated at the zero reading.

The improved automated method for calibrating conventional scales is best understood upon viewing FIGS. 8 through 13. When a scale 10 normally comes off the assembly line, it looks much like that shown in FIG. 8. In other words, the scale does not accurately read zero with no weight applied to it. In the example shown in FIG. 8, the scale reads approximately 4 pounds. Therefore, the dial requires clockwise adjustment. In the improved process, two photosensors reading down through the access hole 15 both see the same hue of the first marking 22. The relative locations of the photosensors are indicated at 44 and 45. After the adjusting nut 12 is turned clockwise, the scale accurately reads zero as shown in FIG. 9. The two photosensors reading at points 44 and 45, both see different hues. Photosensor 44 reads the hue of the first marking 22 and photosensor 45 reads the background hue of the dial 11. When the photosensors read different hues as shown in FIG. 9, a stop signal is transmitted to the motorized driver mechanism that is turning the adjusting nut 12. Thereafter, the apparatus is told to apply a 200-pound weight to the scale 10.

Figure 11:
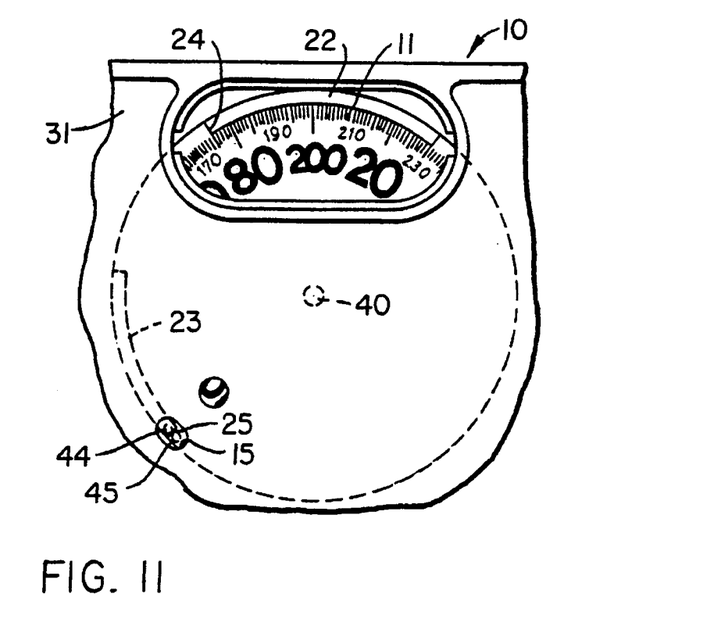
FIG. 11 shows a bathroom-type scale that is properly calibrated at the 200-pound reading.

FIG. 10 shows a scale 10 fresh off the assembly line having just been zeroed and being subjected to a 200-pound calibration weight. As expected, the scale does not read 200 pounds accurately and must be calibrated. In the example shown in FIG. 10, there are too many active coils 42 in the main spring 32 and therefore the calibration stud 13 must be turned in the clockwise direction. The two photosensors reading at 44 and 45 both see the same hue of the second marking 23. After the calibration stud has been rotated sufficiently in the clockwise direction, the two photosensors 44 and 45 read the hue of the second marking 23 and the background hue of the dial 11 as shown in FIG. 11. Once the two different hues are simultaneously read by photosensors 44 and 45, a stop signal is transmitted to the motorized wrench mechanism that is rotating the calibration stud 13. The 200-pound weight is released.

Figure 12:
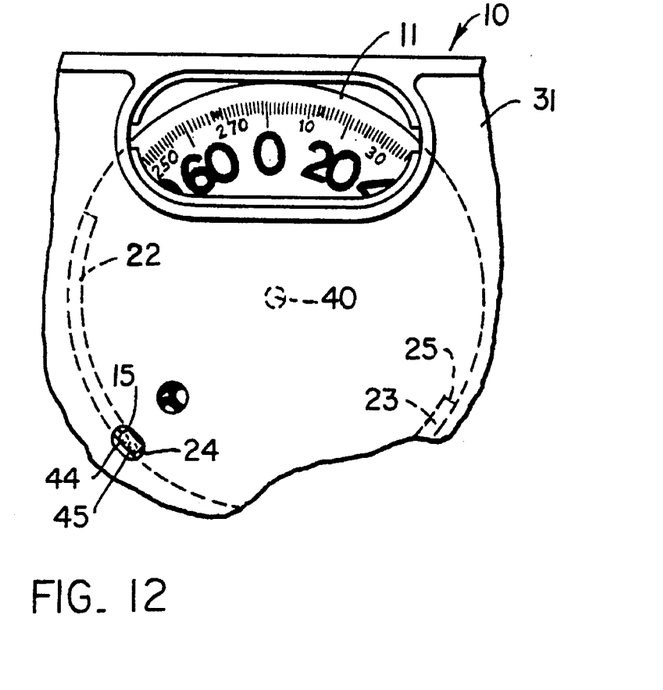
FIG. 12 shows a bathroom-type scale in need of zero calibration following the 200 pound calibration.
Figure 13:
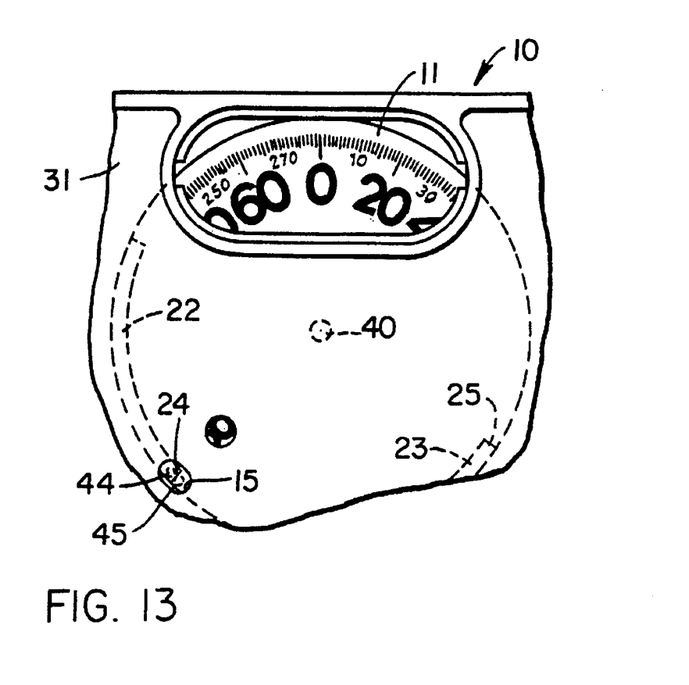
FIG. 13 shows a bathroom-type scale properly calibrated at the zero reading.

FIG. 11 shows a scale after perhaps one zero and one 200-pound calibration. After the 200-pound calibration, the zero calibration is necessarily affected and the scale must be re-zeroed. As seen in FIG. 12, a clockwise adjustment in the adjusting nut 12 of about 2½ pounds (as contrasted to the initial disparity of 4 pounds) is necessary. Once the photosensors 44 and 45 are in the position shown in FIG. 13, a stop signal is sent to the motorized driver mechanism that is turning the adjusting nut 12.

The above cycle must be repeated between two and three times and sometimes between four and five times. As stated above, the calibration process is a labor-intensive procedure when performed manually. The present invention provides both a scale that may be calibrated automatically by a machine and a method for doing so. Thus, one of the most labor-intensive procedures in the manufacture of conventional bathroom-type scales is eliminated. Manufacturing costs and production costs are thereby lowered.

One advantage of the present invention lies in the fact that manufacturers need not completely redesign their scales to incorporate it. The only design changes are the access holes 14, 15, 16, 46, the notches 26 on the zero knob 12 and the markings 22, 23 on the dial 11. The aesthetics and/or appearance of the scales is not compromised because the markings 22, 23 remain hidden under the upper housing 31 and the access holes 14, 15, 16 are covered by a foot pad (not shown). Of course, the bottom access hole 46 is never seen by the consumer.

Although a single preferred embodiment of the present invention has been illustrated and described, it will at once be apparent to those skilled in the art that variations may be made within the spirit and scope of the invention. Accordingly, it is intended that the scope of the invention be limited solely by the scope of the hereafter appended claims and not by the specific wording in the foregoing description.

We claim:

1. A mechanically calibratable scale, the scale comprising:

a bottom pan;

a scale mechanism located between the bottom pan and an upper housing, the scale mechanism including an adjusting nut, a calibrating stud, a main spring and a dial, the dial being round and including an outer periphery;

the upper housing including at least two holes means, a first hole means located over the calibrating stud, the first hole means providing access to the calibrating stud by a wrench means for mechanical calibration of the scale after assembly of the scale, the upper housing also including a second hole means, the second hole means located above the outer periphery of the dial, the second hole means providing access by photosensing means to the outer periphery of the dial;

the dial including a first marking and a second marking, both markings being located in a position to be read by photosensing means, the markings being of a hue that is distinguishable by photosensing means from the background hue of the dial, each marking having a first end;

the first end of the first marking being located approximately underneath the second hole means of the upper housing when the scale dial reads approximately zero;

the first end of the second marking being located approximately underneath the second hole means of the upper housing when the scale dial reads approximately a predetermined calibration weight; and the adjusting nut including notches on an outer periphery of the adjusting nut, a portion of the adjusting nut being accessible by a driver means for mechanical zero calibration of the scale after assembly of the scale.

2. The scale of claim 1, further comprising an additional access opening in the upper housing located inside of the outer periphery of the dial and an access opening in the bottom pan located below the additional access opening in the upper housing on an opposing side of the dial, the additional access opening in the upper housing and the access opening in the bottom pan providing access for upper and lower air jets, the upper and lower air jets striking the dial in opposing directions and providing near frictionless vertically stabilized movement of the dial during calibration of the scale.

3. The scale of claim 1, wherein the adjusting nut extends out of an aperture means, the aperture means providing access to the adjusting nut, the aperture means located in a front elevational wall of the bottom pan.

4. The scale of claim 1, wherein the photosensing means comprises two photosensors;

a first photosensor for reading the dark hue of the first and second markings;

a second photosensor for reading the light hue of the background of the dial;

the scale being properly calibrated when the first end of a marking appears below the second hole means in the upper housing and the first photosensor reads the dark hue of the marking and the second photosensor reads the light hue of the background of the dial.

5. The scale of claim 1, wherein the photosensing means comprises two photosensors;

a first photosensor for reading the light hue of the first and second markings;

a second photosensor for reading the dark hue of the background of the dial;

the scale being properly calibrated when the first end of a marking appears below the second hole means in the upper housing and the first photosensor reads the light hue of the marking and the second photosensor reads the dark hue of the background of the dial.

6. The scale of claim 1,
wherein the length of the first and second markings is from about 1 inch to about 2 inches.

7. The scale of claim 1,
wherein the length of the first and second markings is from about ¼ inch to about 1 inch.

8. The scale of claim 1,
wherein the predetermined calibration weight is about 200 pounds.

9. The scale of claim 1,
wherein the predetermined calibration weight is from about 150 pounds to about 250 pounds.

10. A mechanically calibratable scale, the scale comprising:

a bottom pan, the bottom pan including a hole, the hole providing access for air jet means;

a scale mechanism located in between the bottom pan and an upper housing, the scale mechanism including an adjusting nut, a calibrating stud, a main spring and a dial, the dial being round and including an outer periphery;

the upper housing including at least three holes, a first hole located over the calibrating stud, the first hole providing access to the calibrating stud by a wrench means for mechanical calibration after assembly of the scale, the upper housing also including a second hole, the second hole located above the outer periphery of the dial, the second hole providing access to the outer periphery of the dial by photosensing means, the upper housing also including a third hole, the third hole located inside and above the outer periphery of the dial, the third hole providing access to the surface of the dial by air jet means;

the dial including a first marking and a second marking, both markings being located along the outer periphery of the dial, the markings being of a hue that is distinguishable by photosensing means from the background hue of the dial, each marking having a first end;

the first end of the first marking being located approximately underneath the second hole of the upper housing when the scale dial reads approximately zero;

the first end of the second marking being located approximately underneath the second hole of the upper housing when the scale dial reads approximately 200 pounds;

the adjusting nut being of a flat, circular shape and including notches on the outer periphery of the adjusting nut, a portion of the adjusting nut extending out of an aperture located in a front elevational wall in the bottom pan, the aperture enabling the notches to be accessible to a driver means for mechanical zero calibration of the scale after assembly of the scale; and the air jet means extending through the hole in the bottom pan and the air jet means extending through the third hole in the upper housing being oppositely directed, the oppositely directed air jet means providing near frictionless movement of the dial during calibration of the scale.

11. A method for calibrating a scale, the method comprising;

placing the scale on a flat surface with no weight applied to the scale,
the scale including
a bottom pan,
a scale mechanism located in between the bottom pan and an upper housing, the scale mechanism including an adjusting nut, a calibrating stud, a main spring and a dial, the dial being round and including an outer periphery, the upper housing including at least two holes means, a first hole means located over the calibrating stud, the first hole means providing access to the calibrating stud by a wrench means for mechanical calibration of the scale after assembly of the scale, the upper housing also including a second hole means, the second hole means located above the outer periphery of the dial, the second hole means providing access by photosensing means to the outer periphery of the dial, the dial including a first marking and a second marking, both markings being located in a position to be read by photosensing means, the markings being of a hue that is distinguishable by photosensing means from the background hue of the dial, each marking having a first end, the first end of the first marking being located approximately underneath the second hole means of the upper housing when the scale dial reads approximately zero, the first end of the second marking being located approximately underneath the second hole means of the upper housing when the scale dial reads approximately a predetermined calibration weight, and the adjusting nut including notches on the outer periphery of the adjusting nut, a portion of the adjusting nut being accessible to a driver means for mechanical zero calibration of the scale after assembly of the scale, calibrating the scale at zero by reading the dial through the second hole means in the upper housing with photosensor means, and when first end of the first marking is not detected by the photosensing means, driver means is activated to automatically adjust the adjusting nut until the first end of the first marking is detected by the photosensing means;

calibrating the scale at a predetermined weight by applying the predetermined weight to the scale, and, when the first end of the second marking is not detected by the photosensing means, the wrench means is activated to automatically adjust the calibrating stud until the first end of the second marking is detected by the photosensing means; and if required, repeating the calibrating of the scale at zero and at a predetermined weight being until two consecutive accurate zero and predetermined weight readings are attained.

12. The method of claim 11,
wherein, the predetermined weight is 200 pounds.

13. The method of claim 11,
wherein the predetermined weight is 150 pounds.

14. A mechanically calibratable scale, the scale comprising:

a bottom pan means, a scale mechanism means located between the bottom pan means and an upper housing means, an adjustment means and a dial means;

means for providing access to the dial means and means for providing access to the adjustment means, the means for providing access to the adjustment means enabling mechanical calibration of the scale after assembly of the scale;

the dial means including a first reference means and a second reference means, both reference means being accessible by sensing means through the means for providing access to the dial means, each reference means having a first end portion;

the first end portion of the first reference means being accessible to the sensing means when the dial means reads approximately zero;

the first end portion of the second reference means being accessible to the sensing means when the dial means reads approximately a predetermined calibration weight.

15. The scale of claim 14, wherein the sensing means is further characterized as including at least one photosensor means.

16. The scale of claim 14, wherein the sensing means includes at least two sensors;

a first sensor for reading the first and second reference means;

a second sensor for reading a contrasting hue of the dial means;

the scale being properly calibrated when the first end portion of a reference means appears through the means for providing access to the dial means and the first sensor reads the reference means and the second sensor reads the hue of the background of the dial means.

17. The scale of claim 14, further comprising means for providing access to the dial means by at least one air jet means.

18. The scale of claim 17, further comprising means for providing access to the dial means by a second air jet means.

19. The scale of claim 14, wherein the length of the first and second reference means is from about 1 inch to about 2 inches.

20. The scale of claim 14, wherein the length of the first and second reference means is from about ¼ inch to about 1 inch.

21. The scale of claim 14, wherein the predetermined calibration weight is about 200 pounds.

22. The scale of claim 14, wherein the predetermined calibration weight is from about 150 pounds to about 250 pounds.

23. A method for calibrating a scale, the method comprising;

placing the scale on a flat surface with no weight applied to the scale, the scale including a bottom pan means, a scale mechanism means located in between the bottom pan means and an upper housing means, the scale mechanism means including a first adjustment means for calibrating the scale with no weight applied thereto and a second adjustment means for calibrating the scale with weight applied thereto, the scale also including a dial means, the scale also including means for providing access to the dial means and means for providing access to the first and second adjustment means, the dial means including a first reference means and a second reference means, both reference means being located in a position accessible by sensing means through the means for providing access to the dial means, each reference means having a first end portion, the first end portion of the first reference means being accessible to the sensing means when the dial means reads approximately zero, the first end portion of the second reference means being accessible to the sensing means when the dial means reads approximately a predetermined calibration weight;

calibrating the scale at zero by reading the dial through the means for providing access to the dial means with sensor means and when first end portion of the first reference means is not detected by the sensing means, a driver means is activated to automatically adjust the first adjustment means until the first end portion of the first reference means is detected by the sensing means;

calibrating the scale at a predetermined weight by applying the predetermined weight to the scale, and, when the first end portion of the second reference means is not detected by the sensing means, a wrench means is activated to automatically adjust the second adjustment means until the first end portion of the second reference means is detected by the sensing means; and if required, repeating the calibrating of the scale at zero and at a predetermined weight being until two consecutive accurate zero and predetermined weight readings are attained.

24. The method of claim 23, wherein, the predetermined weight is 200 pounds.

25. The method of claim 23, wherein the predetermined weight is 150 pounds.

* * * * *